(12) United States Patent
van Asperen et al.

(10) Patent No.: US 11,583,786 B2
(45) Date of Patent: *Feb. 21, 2023

(54) IMMERSED PLATE HEATER SEPARATION SYSTEM

(71) Applicant: FMC Technologies, Inc., Houston, TX (US)

(72) Inventors: Victor van Asperen, Tomball, TX (US); Sander G. Baaren, Houston, TX (US); Wouter Balk, Arnhem (NL)

(*) Notice: Subject to any disclaimer, the term of this patent is extended or adjusted under 35 U.S.C. 154(b) by 0 days.

This patent is subject to a terminal disclaimer.

(21) Appl. No.: 16/799,630

(22) Filed: Feb. 24, 2020

(65) Prior Publication Data

US 2020/0254363 A1    Aug. 13, 2020

Related U.S. Application Data

(63) Continuation of application No. 16/248,609, filed on Jan. 15, 2019, now Pat. No. 10,596,489, which is a
(Continued)

(51) Int. Cl.
| | |
|---|---|
| *B01D 17/00* | (2006.01) |
| *B01D 17/04* | (2006.01) |
| *B01D 19/02* | (2006.01) |
| *B01D 17/02* | (2006.01) |
| *C02F 1/40* | (2023.01) |
| *C02F 1/20* | (2023.01) |
| *C02F 1/02* | (2023.01) |
| *B01D 19/04* | (2006.01) |
| *E21B 43/34* | (2006.01) |
| *C02F 101/32* | (2006.01) |

(52) U.S. Cl.
CPC ........ *B01D 17/042* (2013.01); *B01D 17/0211* (2013.01); *B01D 17/0214* (2013.01); *B01D 17/045* (2013.01); *B01D 19/02* (2013.01); *B01D 19/0409* (2013.01); *B01D 19/0418* (2013.01); *C02F 1/02* (2013.01); *C02F 1/20* (2013.01); *C02F 1/40* (2013.01); *E21B 43/34* (2013.01); *C02F 2101/32* (2013.01)

(58) Field of Classification Search
CPC ............... B01D 19/02; B01D 19/0409; B01D 19/0418; B01D 17/042; B01D 17/0211; B01D 17/0214; B01D 17/045; C02F 1/02; C02F 1/20; C02F 1/40; C02F 2101/32; E21B 43/34; E21B 21/067
USPC .......................................................... 95/253
See application file for complete search history.

(56) References Cited

U.S. PATENT DOCUMENTS

| | | |
|---|---|---|
| 2,739,460 A | 3/1956 | Glasgow |
| 4,511,374 A * | 4/1985 | Heath .................... C10G 33/06 96/184 |

(Continued)

*Primary Examiner* — T. Bennett McKenzie
(74) *Attorney, Agent, or Firm* — Henry C. Query, Jr.

(57) ABSTRACT

A separation system includes an elongated separator vessel having an inlet, a heating section which is located downstream of the inlet, an oil accumulation section which is located downstream of the heating section, and an oil outlet which is connected to the oil accumulation section. The heating section includes an immersed plate heater which is fluidly connected to a heating medium heater that is located externally of the separator vessel. In operation, a heating fluid which is heated in the heating medium heater is circulated through the immersed plate heater to heat the multiphase fluid.

17 Claims, 5 Drawing Sheets

Related U.S. Application Data continuation-in-part of application No. PCT/US2018/013742, filed on Jan. 15, 2018.

(56) References Cited

U.S. PATENT DOCUMENTS

| | | | | |
|---|---|---|---|---|
| 4,533,366 | A * | 8/1985 | Bland | B01D 19/02 |
| | | | | 95/242 |
| 4,579,565 | A * | 4/1986 | Heath | E21B 43/34 |
| | | | | 95/15 |
| 4,596,285 | A | 6/1986 | Dinulescu | |
| 5,947,111 | A | 9/1999 | Neulander et al. | |
| 6,171,465 | B1 * | 1/2001 | Compton | C10G 33/02 |
| | | | | 204/563 |
| 6,537,458 | B1 * | 3/2003 | Polderman | B01D 17/00 |
| | | | | 210/801 |
| 6,779,606 | B1 * | 8/2004 | Lopez | F28D 9/00 |
| | | | | 166/57 |
| 8,465,572 | B1 | 6/2013 | Ball, IV et al. | |
| 9,157,035 | B1 | 10/2015 | Ball, IV et al. | |
| 9,550,945 | B1 | 1/2017 | Ball, IV et al. | |
| 2005/0230296 | A1 * | 10/2005 | Edmondson | B01D 17/0214 |
| | | | | 210/187 |
| 2006/0010887 | A1 * | 1/2006 | Lee | F28F 3/04 |
| | | | | 62/93 |
| 2008/0063771 | A1 | 3/2008 | Dumm | |
| 2013/0020078 | A1 * | 1/2013 | Vasudevan | E21B 43/2406 |
| | | | | 166/266 |
| 2013/0025461 | A1 * | 1/2013 | Gouy | B01D 46/003 |
| | | | | 96/189 |
| 2013/0075338 | A1 * | 3/2013 | Murtagh | B03D 1/1412 |
| | | | | 210/151 |
| 2013/0083620 | A1 * | 4/2013 | Hypes | B01J 4/004 |
| | | | | 366/136 |
| 2013/0223826 | A1 * | 8/2013 | Bruce | B01D 17/042 |
| | | | | 392/471 |
| 2014/0182368 | A1 * | 7/2014 | Fraser | B01D 17/12 |
| | | | | 73/152.23 |
| 2015/0231525 | A1 * | 8/2015 | Swan | B01D 19/0073 |
| | | | | 203/81 |
| 2015/0306523 | A1 | 10/2015 | Ball, IV | |
| 2016/0186549 | A1 * | 6/2016 | Victory | B01D 17/0211 |
| | | | | 96/182 |
| 2016/0214033 | A1 * | 7/2016 | Kirk | B03D 1/1406 |
| 2016/0237363 | A1 * | 8/2016 | Murray, Sr. | C10L 3/10 |
| 2019/0078028 | A1 * | 3/2019 | Rehm | C10G 53/02 |
| 2020/0340347 | A1 * | 10/2020 | Jensen | F28D 15/00 |

\* cited by examiner

IMMERSED PLATE HEATER SEPARATION SYSTEM

This application is a continuation of U.S. patent application Ser. No. 16/248,609 filed Jan. 15, 2019, which is a continuation-in-part of International Patent Application No. PCT/US2018/013742 filed on Jan. 15, 2018.

The present disclosure is directed to a separation system for separating water from oil in a multiphase hydrocarbon flowstream. More specifically, the disclosure is directed to a separation system which employs an immersed plate heater system to heat the flowstream and thereby facilitate the separation of both light end hydrocarbons and water from the oil in order to meet custody transfer specifications for Basic Sediment and Water (BS&W) content and volatility (e.g., Reid Vapor Pressure).

BACKGROUND OF THE DISCLOSURE

Separation systems for removing water and light end hydrocarbons from oil in a multiphase hydrocarbon flowstream are well known in the art. In certain oilfields, the multiphase hydrocarbon flowstream contains primarily oil with lesser quantities of water, gas and possibly sediment (i.e., solids) fractions. In addition, the oil may contain a number of light end hydrocarbons, which can be defined as the more volatile components of the crude oil, such as methane, butane, ethane and propane. At some point prior to the oil refining process, the water, gas and sediment must be removed from the oil in order to meet custody transfer specifications for basic sediment and water (BS&W) content and volatility (e.g. Reed Vapor Pressure).

Separation systems which use heat to facilitate the separation of water and light end hydrocarbons from oil are commonly referred to as heater-treaters. An example of a prior art heater-treater separation system is shown in FIG. 1. This separation system, generally 10, includes a horizontal separator vessel 12 having an upstream end 14, a downstream end 16, a multiphase fluid inlet 18, a gas outlet 20, a water outlet 22 and an oil outlet 24. The internal volume of the separator vessel 12 is generally divided into a heating section 26, a separation section 28 and an oil accumulation section 30. The heating section 26 is separated from the separation section 28 by a divider plate 32, and the separation section 28 is separated from the oil accumulation section 30 by an overflow weir 34.

In this example, the separation system 10 employs a fire tube heater to heat the hydrocarbon fluid as it flows through the heating section 26. The fire tube heater comprises a U-shaped fire tube 36 (also referred to as a heat tube or a burner tube) which is heated by a gas burner 38. In operation, the burner 38 ignites a flame which produces hot combustion gases that flow through and heat the metal wall of the fire tube, which in turn heats the hydrocarbon fluid.

However, fire tube heaters have several major drawbacks. For example, fire tube heaters are not easily scalable for large flowrates due to the low heat transfer surface area to volume ratio. Thus, for large flowrates several parallel fire tubes are normally required. Also, the trend in field development for the shale market is shifting towards the use of Central Production Facilities, where oil from several well-pad locations is processed. This requires the use of many fire tubes at a single facility, which is not cost effective.

In addition, fire tube heaters require that the fire tube be positioned within the separator vessel. As a result, the flame contained in the fire tube is present inside the vessel where the hydrocarbon flowstream is processed, which creates a safety concern. Furthermore, because the hydrocarbon fluid is heated by a metal tube containing a flame, the temperature of the metal tube cannot be accurately controlled. What is more, the temperature is usually high enough to cause the oil to boil, which can result in pitting of the tube material. Consequently, fire tubes need regular maintenance and inspections, and failures of fire tubes due to this problem have been known to occur. Also, the high temperature of the fire tube can cause fouling of the surface of the tubes by coke and scale deposits, which can inhibit heat transfer and reduce the thermal efficiency of the fire tube heater over time. Furthermore, fire tubes are connected to the separator vessel by a relatively large and complicated flange, which is costly to produce and install.

SUMMARY OF THE DISCLOSURE

In accordance with the present disclosure, a separation system is provided which comprises an elongated separator vessel which includes an inlet, a heating section which is located downstream of the inlet, an oil accumulation section which is located downstream of the heating section, and an oil outlet which is connected to the oil accumulation section; an immersed plate heater which is positioned in the heating section; and a heating medium heater which is located externally of the separator vessel and is fluidly connected to the immersed plate heater. In operation, a heating fluid is heated in the heating medium heater and is circulated through the immersed plate heater to heat the multiphase fluid.

In accordance with one aspect of the disclosure, the immersed plate heater comprises an immersed plate heater bank. The immersed plate heater bank may comprise a plurality of generally rectangular, generally parallel, spaced apart heat exchanger plates. Also, the heat exchanger plates may be oriented generally vertically in the heating section generally parallel with a longitudinal axis of the separator vessel.

In accordance with another aspect of the disclosure, the heating medium heater comprises a thermal fluid system.

In accordance with yet another aspect of the disclosure, the separator vessel includes an upstream section which is located downstream of the inlet and upstream of the heating section.

In accordance with a further aspect of the disclosure, the upstream section is separated from the heating section by at least one partially perforated baffle plate, the partially perforated baffle plate including a solid upper portion and a perforated lower portion which comprises a plurality of through holes.

In accordance with one aspect of the disclosure, the separator vessel includes a separation section which is located downstream of the heating section and upstream of the oil accumulation section, the separation section being separated from the oil accumulation section by an overflow weir.

In accordance with another aspect of the disclosure, the heating section is separated from the separation section by at least one fully perforated baffle plate.

In accordance with yet another aspect of the disclosure, the separation system includes a plate pack coalescer which is positioned in the separation section.

In accordance with a further aspect of the disclosure, the separation system includes an inlet device which is positioned between the inlet and the upstream section.

In accordance with one aspect of the disclosure, the separation system comprises a run-off plate which extends from the inlet device to the upstream section.

In accordance with another aspect of the disclosure, the run-off plate is connected to the partially perforated baffle plate.

The present disclosure is also directed to a method for treating a hydrocarbon flowstream. The method comprises the steps of directing the hydrocarbon flowstream into an elongated separator vessel which includes at least a heating section and an oil accumulation section, the oil accumulation section being located downstream of the heating section; directing at least a portion of the hydrocarbon flowstream into the heating section; heating said portion of the hydrocarbon flowstream with an immersed plate heater which is positioned in the heating section and is fluidly connected to a heating medium heater which is located externally of the separator vessel.

In accordance with one aspect of the disclosure, the immersed plate heater comprises an immersed plate heater bank.

In accordance with another aspect of the disclosure, the heating medium heater comprises a thermal fluid system.

In accordance with yet another aspect of the disclosure, the separator vessel includes an upstream section which is located upstream of the heating section and the method further comprises directing said portion of the hydrocarbon flowstream into the upstream section, and then directing said portion of the hydrocarbon flowstream from the upstream section into a lower portion of the heating section to thereby cause the flowstream to progress both horizontally and vertically through the immersed plate heater.

In accordance with a further aspect of the disclosure, the separator vessel includes a separation section which is located downstream of the heating section, said portion of the hydrocarbon flowstream includes at least a water fraction and an oil fraction, said oil fraction comprises a number of light end hydrocarbons, and the method further comprises directing said portion of the hydrocarbon flowstream from the heating section into the separation section; wherein the water fraction and/or the light end hydrocarbons separate from the oil fraction in the separation section.

In accordance with another aspect of the disclosure, the separator vessel includes an oil accumulation section which is located downstream of the separation section and the method further comprises directing the oil fraction from the separation section into the oil accumulation section.

The present disclosure is further directed to a separation system for separating a multiphase fluid into an oil fraction and at least one of a water fraction and a gas fraction. The separation system of this embodiment comprises an elongated separator vessel which includes a multiphase fluid inlet and an oil outlet which is located downstream of the multiphase fluid inlet; a first immersed plate heater which is positioned in the separator vessel between the multiphase fluid inlet and the oil outlet; a heating medium heater which is located externally of the separator vessel and is fluidly connected to the first immersed plate heater; wherein a heating fluid which is heated in the heating medium heater is circulated through the first immersed plate heater to heat the multiphase fluid; a second immersed plate heater which is positioned in the separator vessel between the multiphase fluid inlet and the oil outlet, the second immersed plate heater comprising an inlet and an outlet; and an oil discharge line which is connected between the oil outlet and the inlet of the second immersed plate heater; wherein the oil fraction discharged from the oil outlet is circulated through the second immersed plate heater to heat the multiphase fluid.

In accordance with one aspect of this embodiment, the second immersed plate heater comprises an immersed plate heater bank.

In accordance with another aspect of this embodiment, the immersed plate heater bank comprises a plurality of generally rectangular, generally parallel, spaced apart heat exchanger plates.

In accordance with yet another aspect of this embodiment, the separator vessel includes an upstream section which is located downstream of the multiphase fluid inlet and a heating section which is located downstream of the upstream section, and wherein the first immersed plate heater is positioned in the heating section and the second immersed plate heater is positioned in one of the upstream section and the heating section.

In accordance with a further aspect of this embodiment, the separator vessel includes a heating section which is located downstream of the multiphase fluid inlet and a separation section which is located downstream of the heating section, and wherein the first immersed plate heater is positioned in the heating section and the second immersed plate heater is positioned in one of the heating section and the separation section.

In accordance with still another aspect of this embodiment, the separator vessel includes an upstream section which is located downstream of the multiphase fluid inlet, a heating section which is located downstream of the upstream section, and a separation section which is located downstream of the heating section, and wherein the first immersed plate heater is positioned in the heating section and the second immersed plate heater is positioned in one of the upstream section, the heating section and the separation section.

In accordance with another aspect of this embodiment, the first and second immersed plate heaters are positioned in the heating section.

The present disclosure is also directed to a method for separating a multiphase fluid into an oil fraction and at least one of a water fraction and a gas fraction. The method comprises directing the multiphase fluid into an elongated separator vessel which includes a multiphase fluid inlet and an oil outlet; heating the multiphase fluid with a first immersed plate heater which is positioned in the separator vessel and is fluidly connected to a heating medium heater that is located externally of the separator vessel; separating the oil fraction from the multiphase fluid and discharging the oil fraction through the oil outlet; and heating the multiphase fluid with a second immersed plate heater which is positioned in the separator vessel and is fluidly connected to the oil outlet; wherein the oil fraction discharged from the oil outlet is circulated through the second immersed plate heater to heat the multiphase fluid.

In accordance with one aspect of this method, the second immersed plate heater comprises an immersed plate heater bank.

In accordance with another aspect of this method, the immersed plate heater bank comprises a plurality of generally rectangular, generally parallel, spaced apart heat exchanger plates.

In accordance with yet another aspect of this method, the separator vessel includes an upstream section which is located downstream of the multiphase fluid inlet and a heating section which is located downstream of the upstream section, and wherein the first immersed plate heater is positioned in the heating section and the second immersed plate heater is positioned in one of the upstream section and the heating section.

In accordance with a further aspect of this method, the separator vessel includes a heating section which is located downstream of the multiphase fluid inlet and a separation section which is located downstream of the heating section, and wherein the first immersed plate heater is positioned in the heating section and the second immersed plate heater is positioned in one of the heating section and the separation section.

In accordance with still another aspect of this method, the separator vessel includes an upstream section which is located downstream of the multiphase fluid inlet, a heating section which is located downstream of the upstream section, and a separation section which is located downstream of the heating section, and wherein the first immersed plate heater is positioned in the heating section and the second immersed plate heater is positioned in one of the upstream section, the heating section and the separation section.

In accordance with another aspect of this method, the first and second immersed plate heaters are positioned in the heating section.

Thus, the separation system of the present disclosure uses an indirect heating system to heat the hydrocarbon flowstream in the heating section of the separator vessel. The heating system includes an immersed plate heater which is located in the heating section and a heating medium heater, such as a thermal fluid system, which is located externally of the separator vessel. The heating medium heater heats the heating medium and circulates it through the immersed plate heater to thereby heat the hydrocarbon flowstream in an efficient, effective manner.

The use of the immersed plate heater in the separation system of the present disclosure offers several advantages over the prior art. Since heat exchanger plates have a much higher heat transfer surface area to volume ratio than fire tubes, immersed plate heaters are more efficient and easier to scale than conventional fire tube heaters, and smaller and/or fewer immersed plate heaters are required for the same production capacity and heat duty. Also, since the heating medium heater can be located a certain distance away from the separator vessel, little risk exists that the hydrocarbon fluid will be exposed to the active heating element of the heating medium heater, thus alleviating a safety concern posed by fire tube heaters. Furthermore, since the temperature of the immersed plate heater can be controlled, boiling of the oil in the hydrocarbon flowstream and the resulting "pitting" that this causes can be avoided. Moreover, the ability to control the temperature of the immersed plate heater renders the surfaces of the heat exchanger plates less susceptible to fouling by coke and scale deposits, which preserves the heat transfer capability of the immersed plate heater.

In accordance with an additional embodiment of the present disclosure, the separation system includes two immersed plate heaters for heating the multiphase fluid in the separator vessel: a first immersed plate heater which is heated by the heating medium heater, and a second immersed plate heater which is heated by the oil fraction exiting the oil outlet. Consequently, the heating requirements of the heating medium heater are lessened, which in turn enables a smaller and less costly heating medium heater to be used and reduces the gas consumption and emissions of the unit. In addition, the immersed plate heater reduces the temperature of the oil exiting the oil outlet, which accordingly eliminates the need for external means for cooling the oil before it is exported.

These and other objects and advantages of the present disclosure will be made apparent from the following detailed description, with reference to the accompanying drawings. In the drawings, the same reference numbers may be used to denote similar components in the various embodiments.

DETAILED DESCRIPTION

The separation system of the present disclosure, while particularly useful for separating water and/or light end hydrocarbons from oil in a multiphase hydrocarbon flowstream, may be employed in a variety of separation applications. Therefore, the following description should not be considered limited by the particular hydrocarbon fractions which are treated by the separation system. For example, the separation system may be useful in separating water and/or light end hydrocarbons from oil in order to meet the custody transfer requirements for oil, for separating oil from water in order to meet the custody transfer requirements for water, and in separating gas from oil and water in order to meet the custody transfer requirements for gas. Further applications for the separation system of the present disclosure may be derived by persons of ordinary skill in the art from the teachings of the following disclosure.

In a general embodiment, the separation system of the present disclosure comprises an elongated separator vessel having an inlet, a heating section which is located downstream of the inlet, an oil accumulation section which is located downstream of the heating section, and an oil outlet which is connected to the oil accumulation section. The separation system also includes an immersed plate heater which is positioned in the heating section and a heating medium heater which is located externally of the separator vessel and is fluidly connected to the immersed plate heater. In use, the heating medium heater heats the heating medium and circulates it through the immersed plate heater to thereby heat the hydrocarbon flowstream, which lowers the viscosity of the flowstream and thereby facilitates gravity separation of the water from the oil. At the same time, heating the oil reduces the solubility of the light end hydrocarbons to thereby facilitate their transition from the liquid phase to the gas phase, thus reducing the volatility of the oil. In a more specific embodiment, the immersed plate heater comprises an immersed plate heater bank, and the heating medium heater comprises a thermal fluid system.

Figure 2:
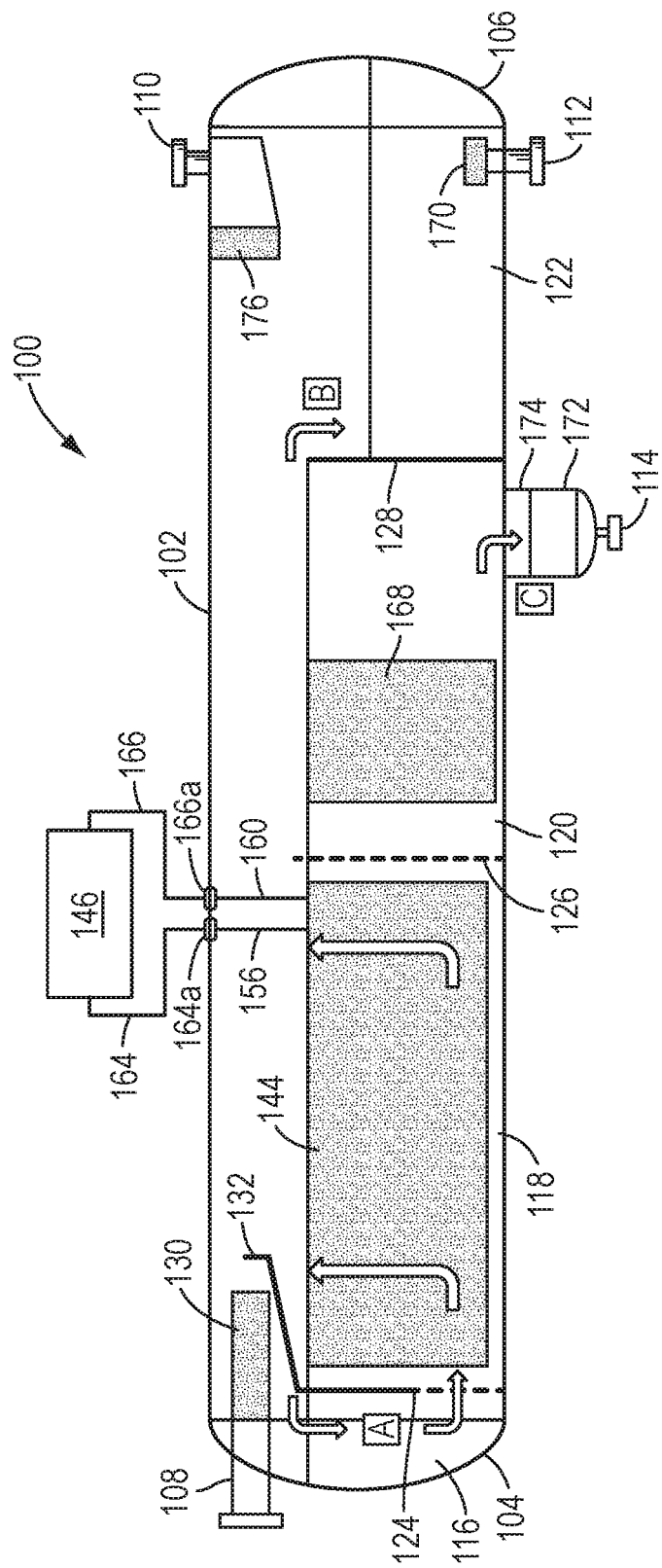
FIG. 2 is a schematic representation of a first illustrative embodiment of the separation system of the present disclosure.

An illustrative embodiment of the separation system of the present disclosure is depicted in FIG. 2. The separation system of this embodiment, generally 100, includes an elongated, generally horizontally-oriented separator vessel 102 having an upstream end 104, a downstream end 106, an inlet 108, a gas outlet 110, an oil outlet 112 and a water outlet 114. The interior of the separator vessel 102 is segregated into one or more of an upstream section 116 which is located downstream of the inlet, a heating section 118 which is located downstream of the upstream section, a separation section 120 which is located downstream of the heating section, and an oil accumulation section 122 which is located downstream of the separation section. The upstream section 116 is separated from the heating section 118 by one or more partially perforated baffle plates 124, the heating section is separated from the separation section 120 by one or more fully perforated baffle plates 126, and the separation section is separated from the oil accumulation section 122 by an overflow weir 128.

In operation, the relatively low temperature multiphase hydrocarbon flowstream enters the separator vessel 102 through the inlet 108. Immediately downstream of the inlet 108, the hydrocarbon flowstream may encounter an optional inlet device 130, which functions to disperse the flowstream to thereby facilitate bulk separation of the gas fraction from the oil/water fraction. The inlet device 130 may comprise, e.g., a flat impact plate, a dished impact plate, a half open pipe, an open pipe which is directed at the upstream end 104 of the separator vessel 102, a vane inlet device, or one or more inlet cyclones, all of which are conventional devices known to persons skilled in the art.

After exiting the inlet device 130, the low temperature oil/water fraction (and any solids, if present) is directed by an appropriate run-off plate 132 into the upstream section 116 of the separator vessel 102, as indicated by the arrow A, while the gas fraction exits the separation vessel 102 through the gas outlet 110. In the case where the inlet device 130 comprises one or more inlet cyclones, however, the run-off plate 132 may be eliminated since the liquid outlets of the inlet cyclones may be directly connected to the upstream section 116.

Figure 1:
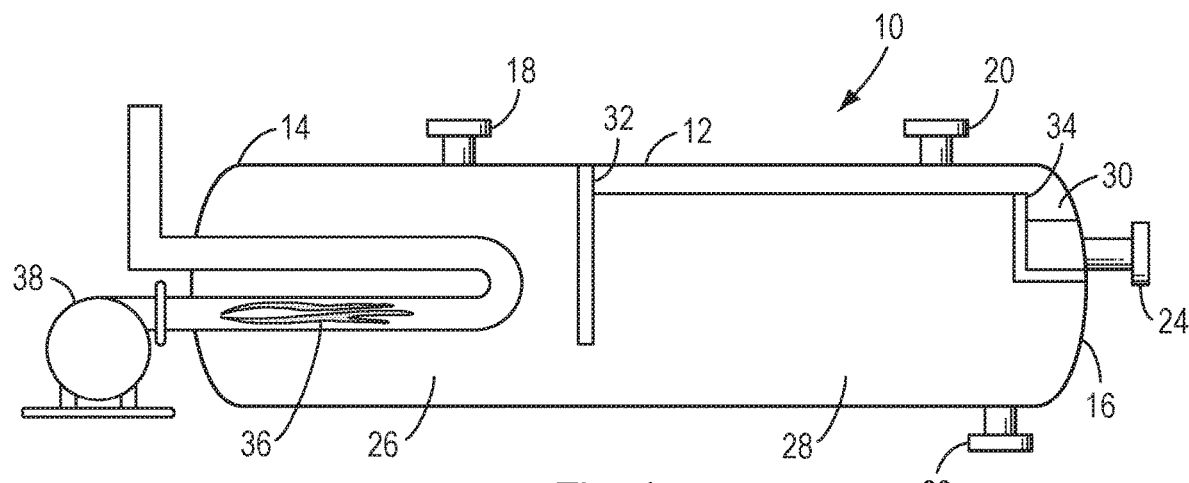
FIG. 1 is a schematic representation of a prior art separation system.
Figure 3:
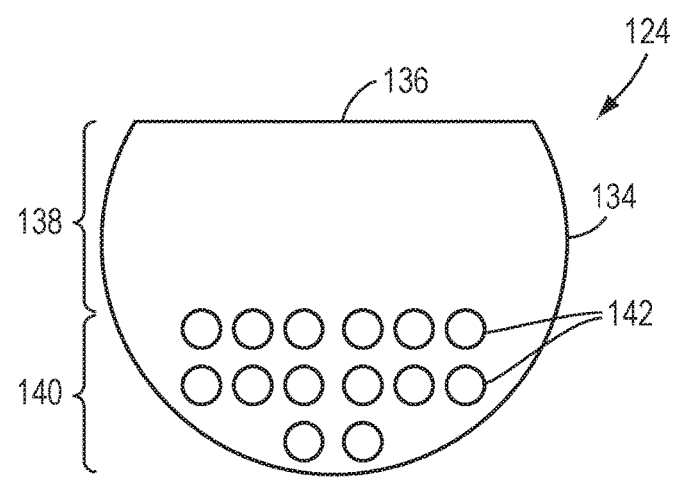
FIG. 3 is a schematic representation of an example of a partial perforated baffle which is suitable for use with the separation systems of the present disclosure.

From the upstream section 116, the oil/water fraction flows through the partially perforated baffle plate 124 into the heating section 118. Referring to FIG. 3, the baffle plate 124 comprises a generally semicircular configuration having a curved peripheral edge 134 which conforms to the interior side and bottom surfaces of the separator vessel 102, and a straight top edge 136 which is located near and may optionally be connected to the lower edge of the run-off plate 132. The baffle plate 124 also includes a solid upper portion 138 and a perforated lower portion 140 which comprises a plurality of through holes 142. This design not only operates to even out the flow of the oil/water fraction, but it also ensures that the oil/water flowstream will enter the lower part of the heating section 118, which as will be discussed below will enhance the heating of the oil/water flowstream in the heating section. Although only one partially perforated baffle plate 124 is shown in FIG. 2, two or more such baffle plates may be employed in different embodiments of the separation system of the present disclosure. In this case, the number of and spacing between the baffle plates 124 may be determined based on the requirements of a particular separation application.

In the heating section 118, the oil/water flowstream is heated by a heating system which as shown in FIG. 2 includes an immersed plate heater 144 which is positioned in the heating section 118 and a heating medium heater 146 which is located externally of the separator vessel 102 and is fluidly connected to the immersed plate heater. Since the partially perforated baffle plate 124 forces the oil/water flowstream to enter the lower part of the heating section 118, the flowstream will flow both horizontally and vertically through the immersed plate heater 144. This will prolong the exposure of the oil/water flowstream to the immersed plate heater and thereby maximize the heating of the flowstream. As the oil/water flowstream is heated, the oil fraction will rise to the surface of the flowstream due to the effects of natural convection and buoyancy, while any light end hydrocarbon components of the oil will evaporate and exit the separator vessel 102 through the gas outlet 110.

The immersed plate heater 144 generally includes one or more heat exchanger plates which each comprise a series of internal passages through which a heating medium (also called a thermal medium) flows. The heat exchanger plates may be constructed, for instance, by welding together two sheets of metal, at least one of which is die formed to create the internal passages. In one embodiment, the immersed plate heater 144 may comprise a plurality of generally parallel, spaced-apart heat exchanger plates which are secured together by a frame member to thereby form an immersed plate heater bank. The heat exchanger plates may be oriented generally vertically in the heating section 118 generally parallel with the longitudinal axis of the separator vessel 102. Alternatively, the heat exchanger plates may be oriented at any angle and in any configuration which is determined to provide optimum heating for a given separation application.

The number, configuration, size, material, type (e.g., pillow or serpentine) and orientation of the heat exchanger plates, as well as the spacing between adjacent plates, may be determined for a particular separation application using, e.g., a conventional computational fluid dynamics program. Also, to ensure that any separated water fraction is not directly heated by the immersed plate heater and that any separated solids do not accumulate between the heat exchanger plates, the bottom of the heat exchanger plates is ideally be spaced a certain distance from the bottom of the separator vessel 102, which distance may be determined based on the amount of water and solids that the oil/water fraction is expected to contain.

Figure 4:
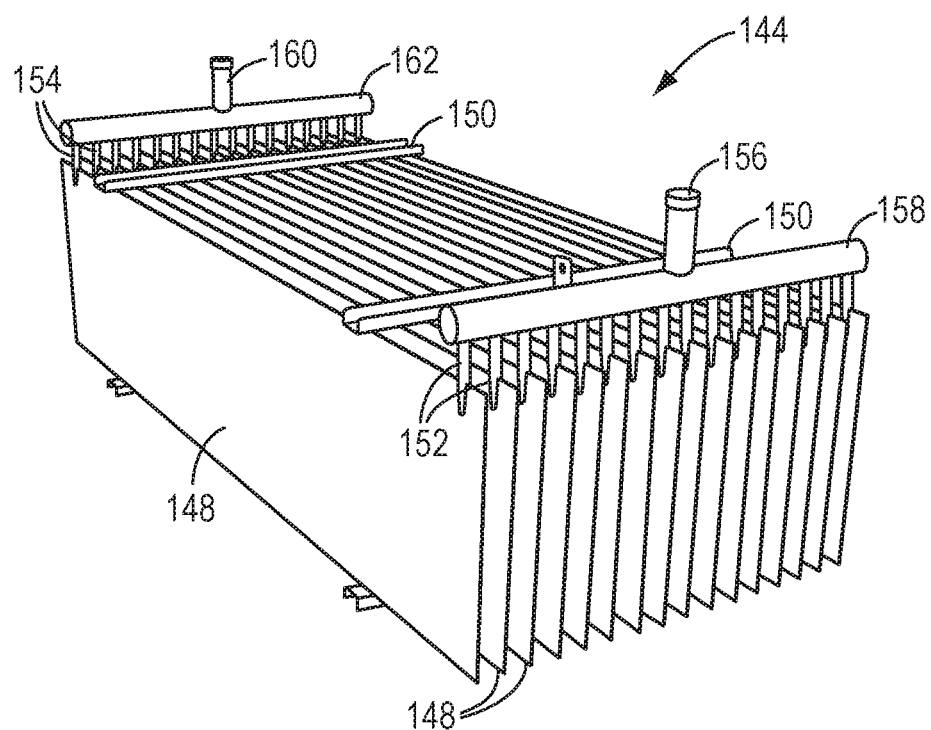
FIGS. 4 and 5 are a perspective views of examples of immersed plate heater banks which are suitable for use with the separation systems of the present disclosure.

An example of an immersed plate heater 144 which is suitable for use in the separation system 100 of the present disclosure is the immersed plate heater bank depicted in FIG. 4. This illustrative immersed plate heater bank 144, which is manufactured by Omega Thermo Products of Stratford, Wis., includes a plurality of generally rectangular heat exchanger plates 148 which are secured together in a generally vertical, generally parallel, spaced-apart manner by a pair of frame members 150. Each heat exchanger plate 148 comprises an inlet conduit 152 and an outlet conduit 154. The inlet conduits 152 are connected to a common inlet pipe 156 by an inlet manifold 158, and the outlet conduits 154 are connected to a common outlet pipe 160 by an outlet manifold 162.

In operation of the immersed plate heater bank 144, a heating medium which has been heated by the heating medium heater 146 is conveyed through the inlet pipe 156 and the inlet manifold 158 into the inlet conduits 152 of the heat exchanger plates 148. From the inlet conduits 152, the heating medium flows through the internal passages of the heat exchanger plates 148 toward the outlet conduits 154. As the relatively hot heating medium flows through the internal passages, it will release its heat to the oil/water flowstream. The heat-depleted heating medium will then exit the heat exchanger plates 148 through the outlet conduits 154, the outlet manifold 162 and the outlet pipe and return to the heating medium heater 146. Heating mediums which are suitable for use with the separation system 100 include, but are not limited to, steam, water, thermal oil and water/glycol solutions.

A suitable heating medium heater 146 for use in the separation system 100 of the present disclosure may comprise a conventional thermal fluid system. A thermal fluid system is an indirect heating device in which the heating medium is heated and circulated to a heat exchange apparatus in a closed loop system. As shown in FIG. 2, the thermal fluid system 146 may be spaced apart from the separator vessel 102 and connected to the inlet and outlet pipes 156, 160 of the immersed plate heater 144 by corresponding inlet and outlet lines 164,166, which are connected through the wall of the separator vessel by corresponding small, standard couplers 164a, 166a. This will ensure that the oil and gas within the separator vessel will not be exposed to the active heating element of the thermal fluid system 146 (such as a gas fired burner).

In operation, the thermal fluid system 146 heats the heating medium to a predetermined temperature and circulates it through the immersed plate heater 144. If the temperature of the oil/water flowstream in the heating section 118 should fall below a predetermined temperature (as determined, e.g., by a suitable temperature sensor), the thermal fluid system 146 will increase the flow rate and/or the temperature of the heating medium through the immersed plate heater 144. This will increase the rate of heat transfer between the heating medium and the oil/water fraction and thereby heat the oil/water flowstream until the predetermined temperature is reached.

Figure 5:
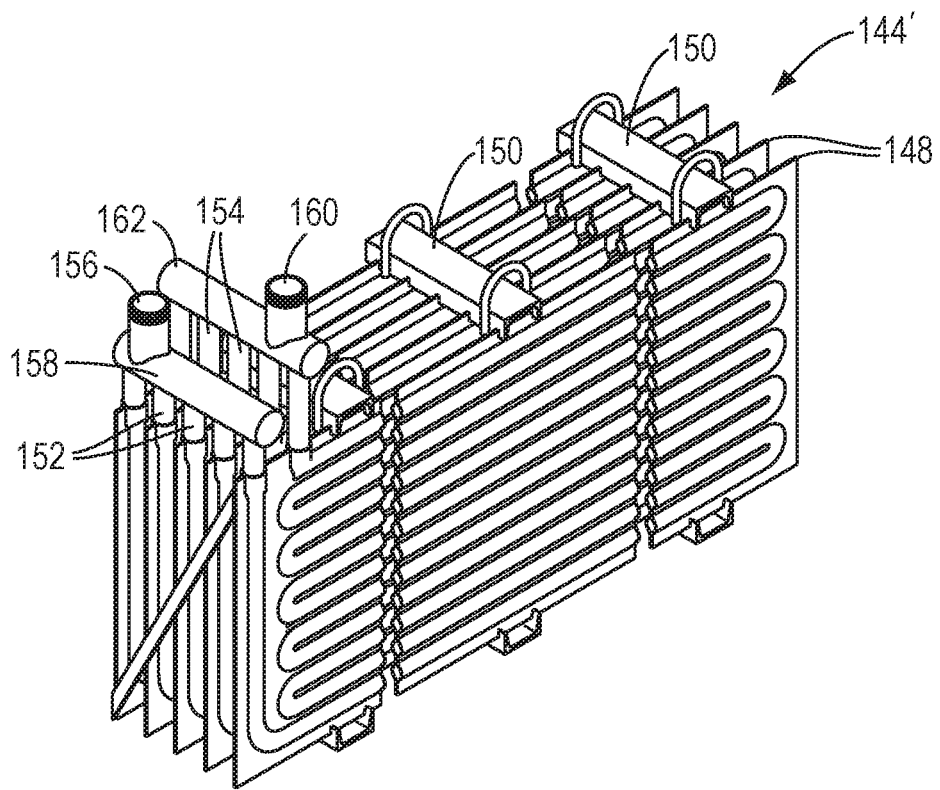

The internal fluid passages of the heat exchanger plates 148 may be configured to provide optimal heat exchange for a given separation application. Referring to FIG. 5, for example, which depicts a Style 50 Platecoil® immersed plate heater bank 144' manufactured by Tranter, Inc. of Wichita Falls, Tex., the internal passage of each heat exchanger plate 148 comprises a serpentine configuration from the inlet conduit 152 to the outlet conduit 154. As with the immersed plate heater 144 depicted in FIG. 4, the heat exchanger plates 148 of the immersed plate heater bank 144' are generally rectangular, are oriented generally vertically and are held together in a generally parallel, spaced-apart relationship by a number of frame members 150. In addition, each heat exchanger plate 148 includes an inlet conduit 152 which is connected to a common inlet pipe 156 by an inlet header 158, and an outlet conduit 154 which is connected to a common outlet pipe 160 by an outlet header 162.

Upon exiting the heating section 118, the oil/water flowstream flows through the perforated baffle plate 126, which functions to evenly distribute the flowstream throughout the cross section of the separation section 120. This will optimize the gravity separation of not only the water fraction (and any solids, if present) from the oil fraction, but also the relatively hot oil from the relatively cold oil. Although only one perforated baffle plate 126 is shown in FIG. 2, two or more such baffle plates may be employed in different embodiments of the separation system of the present disclosure. In this case, the number of and spacing between the baffle plates 126 may be determined based on the requirements of a particular separation application.

If desired or required for a particular separation application, the separation section 120 may include a conventional plate pack coalescer 168 or similar device for increasing the size of the dispersed oil and water droplets to thereby increase the settling rate of the oil and water fractions. The plate pack coalescer 168 comprises a plurality of parallel plates which are oriented at fixed angles relative to the horizontal mid-plane of the separator vessel 102. Due to the fact that the distance between the plate surfaces is small, the dispersed oil and water droplets need only travel a short distance until they reach the oil/water interface. Thus, substantial separation of the oil and water fractions can be effectively achieved over the relatively short length of the plate pack coalescer 168. Furthermore, since the flow between the plates lies in the laminar regime, turbulent eddies which would otherwise negatively affect gravity separation of the droplets are eliminated. A suitable plate pack coalescer for use in the separation system 100 of the present disclosure is available from TechnipFMC of Houston, Tex.

As the oil/water flowstream progresses through the separation section 120, the water fraction will separate from the oil fraction and settle to the bottom of the separator vessel 102. At the downstream end of the separation section 120, the relatively high temperature oil will flow over the overflow weir 128 and into the oil accumulation section 122, as indicated by the arrow B in FIG. 2. The overflow weir 128 is designed such that only the upper portion of the flowstream, which is occupied by the relatively high temperature oil, will flow into the oil accumulation section 122 and the water and the relatively cold oil fractions will remain within the separation section 120. The overflow weir 128 also ensures that the immersed plate heater 144 will remain fully submerged in the oil/water flowstream.

From the oil accumulation section 122, the oil fraction exits the separator vessel 102 through the oil outlet 112. If desired, a conventional vortex breaker 170 may be provided on the oil outlet 112 to prevent the formation of vortexes in the oil, which may induce gas carry-under.

From the separation section 120, the water fraction exits the separator vessel 102 through the water outlet 114, as indicated by the arrow C in FIG. 2. In separation applications in which the water component of the oil/water fraction is low (e.g., 1% of the oil/water fraction), a conventional liquid boot 172 may be positioned between the separator vessel and the water outlet 114 to facilitate measurement of the oil/water interface by certain sensors (such as guided wave radar sensors). Also, a conventional vortex breaker 174 may be provided upstream of the liquid boot 172 or on the water outlet 114 to prevent the formation of vortexes in the water, which may induce oil carry-under.

The light end hydrocarbons which have separated from the oil/water fraction during the various stages of the separation process exist the separator vessel 102 through the gas outlet 110. If required, a conventional demisting device 176 may be provided upstream of the gas outlet 110 to separate any liquid (i.e., oil or water) droplets from the gas before it exits the separator vessel 102. The demisting device 176 may comprise, but is not limited to, a mesh type demister, a vane type demister or a cyclone type demister, such as the SpiraFlow™ cyclone manufactured by TechnipFMC of Houston, Tex.

Figure 6:
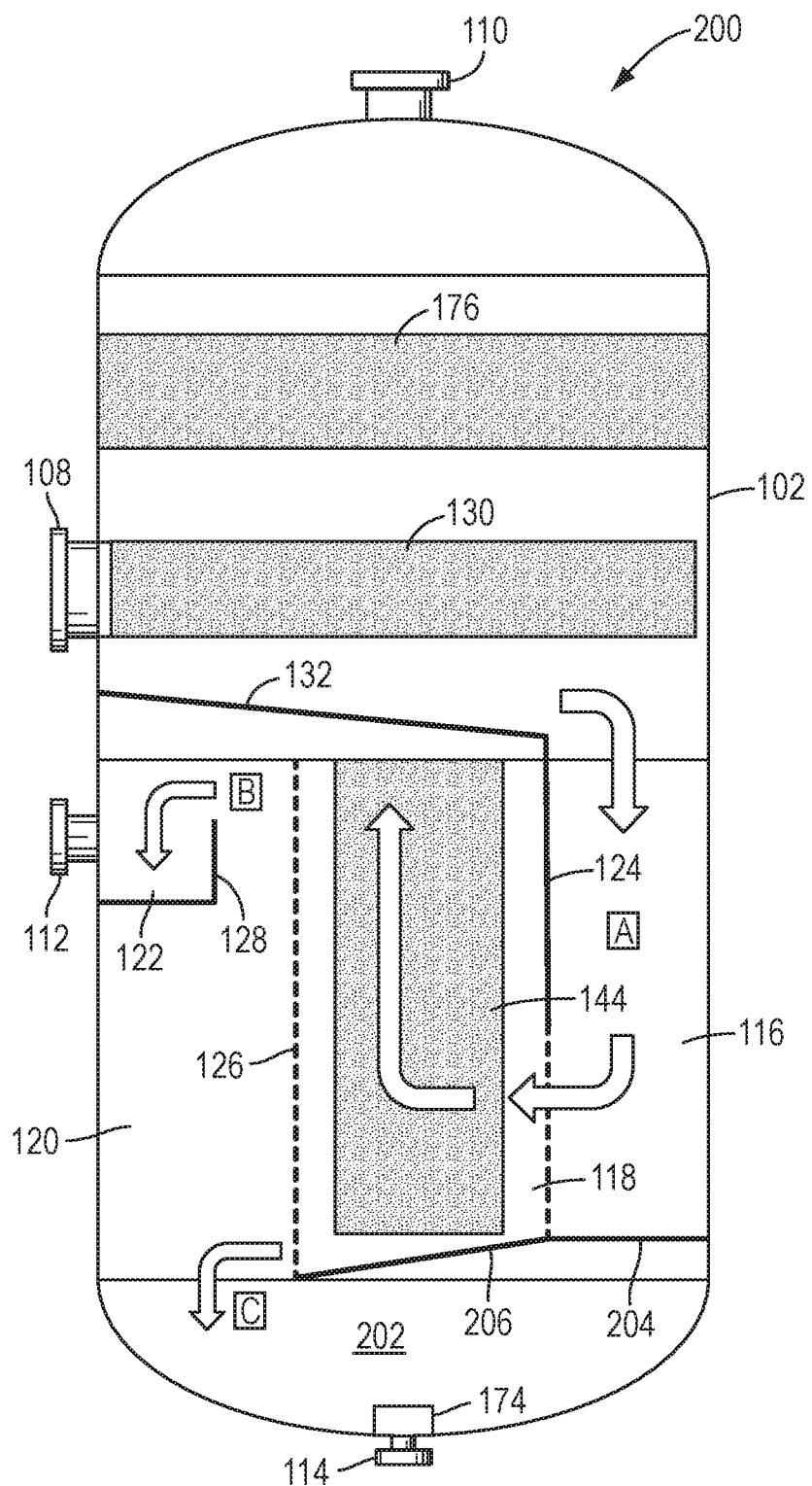
FIG. 6 is a schematic representation of a second illustrative embodiment of the separation system of the present disclosure.

A second illustrative embodiment of the separation system of the present disclosure is shown in FIG. 6. The separation system of this embodiment, generally 200, is similar in many respects to the separation system 100 described above. Therefore, the same reference numbers will be used to designate the similar components. In contrast to the separation system 100, however, the elongated separator vessel 102 of the separation system 200 is oriented generally vertically. Such an orientation may be preferred, for example, in installations where space is limited or in applications where the hydrocarbon flowstream has a relatively high gas to liquid ratio.

Similar to the separation system 100, the separator vessel 102 of the separation system 200 includes an inlet 108, an upstream section 116 which is located downstream of the inlet, a heating section 118 which is located downstream of the upstream section, a separation section 120 which is located downstream of the heating section, and an oil accumulation section 122 which is located downstream of the separation section. The upstream section 116 is separated from the heating section 118 by one or more partially perforated baffle plates 124, the heating section is separated from the separation section 120 by one or more fully perforated baffle plates 126, and the separation section is separated from the oil accumulation section 122 by an overflow weir 128. In this embodiment, the upstream section 116 and the heating section 118 are spaced vertically above the bottom of the separator vessel 102, a lateral portion 202 of the separation section 120 extends beneath these sections, and the upstream section 116 and the heating section 118 are separated from this lateral portion by corresponding bottom plates 204, 206.

In operation, the relatively low temperature hydrocarbon flowstream enters the separator vessel 102 through the inlet 108. Immediately downstream of the inlet 108, the hydrocarbon flowstream may encounter an optional inlet device 130, which as described above functions to disperse the flowstream to thereby facilitate bulk separation of gas from the hydrocarbon flowstream. After exiting the inlet device 130, the flowstream is directed by an appropriate run-off plate 132 into the upstream section 116 of the separator vessel 102, as indicated by the arrow A, while the gas rises and exits the separation vessel 102 through a gas outlet 110. As with the separation system 100, in the case where the inlet device 130 comprises one or more inlet cyclones, the run-off plate 132 may be eliminated since the liquid outlets of the inlet cyclones may be directly connected to the upstream section 116.

From the upstream section 116, the oil/water fraction flows through the partially perforated baffle plate 124 into the heating section 118. As described above, the partially perforated baffle plate 124 functions to even out the oil/water flowstream and ensure that the flowstream enters the lower part of the heating section 118. Although only one partially perforated baffle plate 124 is shown in FIG. 6, two or more such baffle plates may be employed depending on the requirements of a particular separation application.

In the heating section 118, the oil/water flowstream is heated by an immersed plate heater 144. As described above, the immersed plate heater 144 is connected to a heating medium heater (not shown) located externally of the separator vessel 102. As the oil/water flowstream is heated, the oil fraction will rise to the surface of the flowstream due to the effects of natural convection and buoyancy, while the light end hydrocarbon components of the oil will evaporate and exit the separator vessel 102 through the gas outlet 110. In this regard, the run-off plate 132 may be fitted with a conventional goose neck vent (not shown) to prevent the gas from being trapped below the run-off plate.

Upon exiting the heating section 118, the oil/water flowstream flows through the perforated baffle plate 126, which functions to evenly distribute the flowstream and thereby optimize the gravity separation of the water fraction from the oil fraction and also the relatively hot oil from the relatively cold oil. Although only one perforated baffle plate 126 is shown in FIG. 6, two or more such baffle plates may be employed depending on the requirements of a particular separation application.

As the oil/water flowstream exits the heating section 118 and progresses through the separation section 120, the water fraction will separate from the oil fraction, settle to the bottom of the separator vessel 102 (as indicated by the arrow C), and exit the separator vessel through the water outlet 114 (which may include an optional vortex breaker 174). At the same time, the relatively high temperature oil will rise toward the top of the separation section 120, flow over the overflow weir 128 into the oil accumulation section 122 (as indicated by the arrow B), and exit the separator vessel 102 through the oil outlet 112. As discussed above, the overflow weir 128 is designed to ensure that the water and relatively cold oil will remain in the separation section 120 and that the immersed plate heater 144 will remain fully submerged in the oil/water flowstream.

The light end hydrocarbons which have separated from the oil/water fraction during the various stages of the separation process will exit the separator vessel 102 through the gas outlet 110. If required, a conventional demisting device 176 may be provided upstream of the gas outlet 110 to separate any liquid (i.e., oil or water) droplets from the gas before it exits the separator vessel 102.

Figure 7:
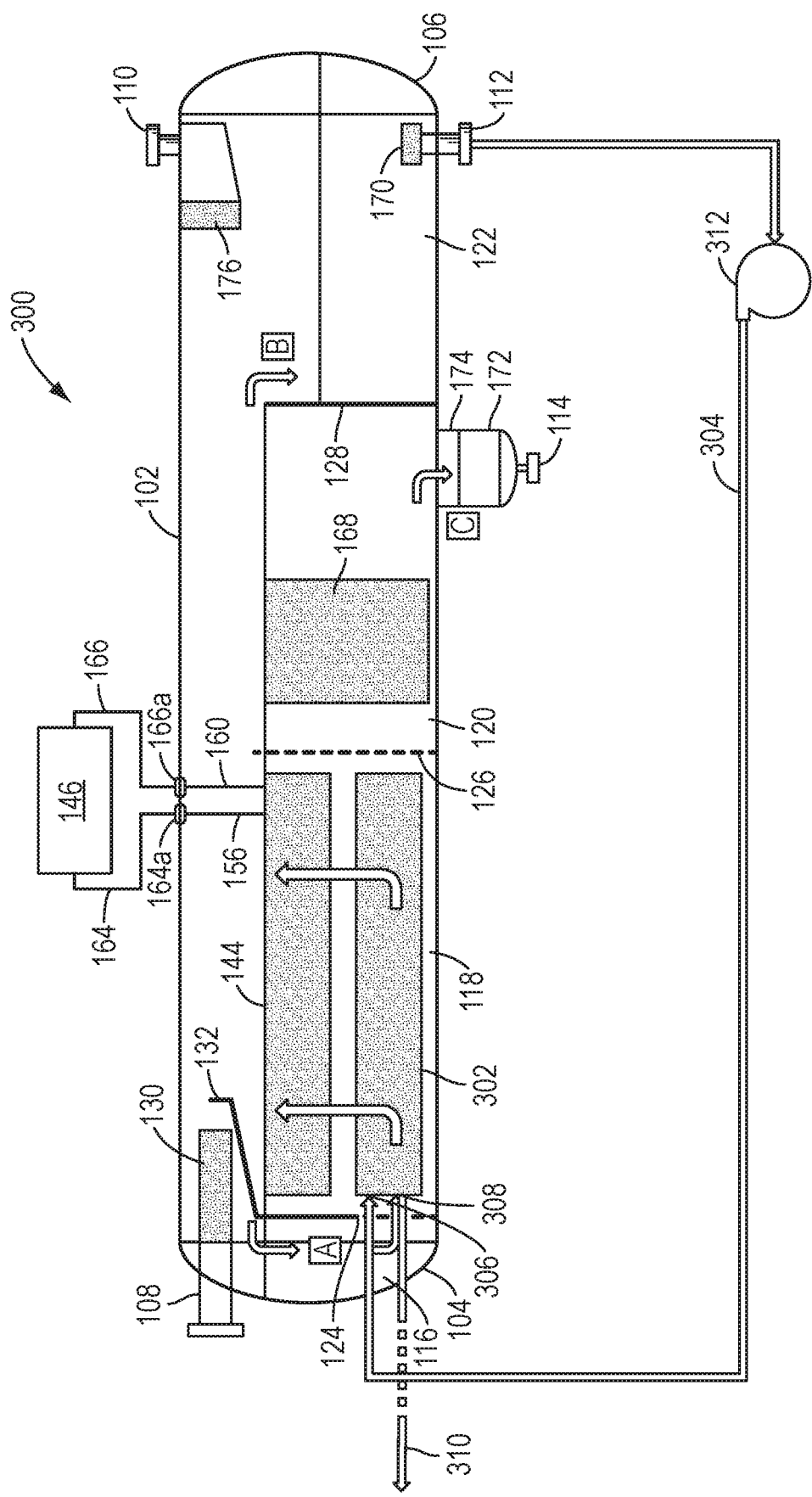
FIG. 7 is a schematic representation of yet another illustrative embodiment of the separation system of the present disclosure.

Another embodiment of the separation system of the present disclosure is shown in FIG. 7. The separation system of this embodiment, generally 300, is similar in many respects to the separation system 100 described above. Thus, only the differences between the separation system 300 and the separation system 100 will be described herein. Also, the same reference numbers will be used to denote the components of the separation system 300 which are similar to the components of the separation system 100.

As shown in FIG. 7, in addition to the components described above in connection with the separation system 100, the separation system 300 includes means for transferring the heat from the oil fraction exiting the oil outlet 112 to the multiphase fluid flowing through the separator vessel 102, for example to the oil/water fraction flowing through the heating section 118. In accordance with the present disclosure, one example of such heat transferring means includes an immersed plate heater 302, which may be similar to any of the immersed plate heaters 144, 144' described above.

However, instead of being connected to a heating medium heater such as the heating medium heater 146 described above, the immersed plate heater 302 is connected to an oil discharge line 304 which in turn is connected to the oil outlet 112. More specifically, the immersed plate heater 302 includes an inlet 306 which is connected to the oil discharge line 304 and an outlet 308 which is connect to, e.g., an export line 310. If desired or required for a particular application, a suitable pump 312 may be provided in the oil discharge line 304 to facilitate the circulation of the oil from the oil outlet 112 to and through the immersed plate heater 302.

In operation, the oil fraction exiting the oil outlet 112 is conveyed through the oil discharge line 304 to the inlet 306 of the immersed plate heater 302. As the relatively hot oil flows through the immersed plate heater 302, it will release its heat to the oil/water fraction flowing through, e.g., the heating section 118. The heat-depleted oil will then exit the immersed plate heater 302 through the outlet 308 and be discharged from the separation system 300 through the export line 310.

Although the immersed plate heater 302 is shown positioned in the heating section 118, it may alternatively be positioned in the upstream section 116, if present, or the separation section 120. Also, although the immersed plate heater 302 is shown positioned below the immersed plate heater 144, it may alternatively be located above, laterally adjacent, upstream or downstream of the immersed plate heater 144. In addition, the immersed plate heater 302 may be oriented parallel or at any angle relative to the immersed plate heater 144.

Thus, in accordance with the present embodiment of the disclosure, the separation system 300 includes two immersed plate heaters for heating the multiphase fluid in the separator vessel 102, namely, the first immersed plate heater 144, which is heated by the heating medium heater 146, and the second immersed plate heater 302, which is heated by the oil exiting the oil outlet 112. As a consequence of this arrangement, the heating requirements of the heating medium heater 146 are lessened, which in turn enables a smaller and less costly heating medium heater to be used and reduces the gas consumption and emissions of the unit. In addition, the immersed plate heater 302 reduces the temperature of the oil exiting the oil outlet 112, which accordingly eliminates the need for external means for cooling the oil before it is exported.

It should be recognized that, while the present disclosure has been presented with reference to certain embodiments, those skilled in the art may develop a wide variation of structural and operational details without departing from the principles of the disclosure. For example, the various elements shown in the different embodiments may be combined in a manner not illustrated above. Therefore, the following claims are to be construed to cover all equivalents falling within the true scope and spirit of the disclosure.

What is claimed is:

1. A separation system comprising:
   an elongated separator vessel which includes an inlet for a multiphase fluid flowstream, an upstream section which is located downstream of the inlet, a heating section which is located downstream of the upstream section, an oil accumulation section which is located downstream of the heating section, and an oil outlet which is connected to the oil accumulation section;
   an immersed plate heater which is positioned in the heating section; and
   a heating medium heater which is located externally of the separator vessel and is fluidly connected to the immersed plate heater;
   wherein a heating fluid which is heated in the heating medium heater is circulated through the immersed plate heater to heat the multiphase fluid;
   wherein the immersed plate heater comprises an immersed plate heater bank comprising a plurality of generally rectangular, generally parallel, spaced apart heat exchanger plates;
   wherein the heat exchanger plates are oriented generally vertically in the heating section generally parallel with a longitudinal axis of the separator vessel;
   wherein the upstream section is located horizontally adjacent to the heating section and is separated from the heating section by at least one partially perforated baffle plate, the partially perforated baffle plate including a solid upper portion and a perforated lower portion which comprises a plurality of through holes; and
   wherein a first vertical distance from a bottom of the separator vessel to a top of the immersed plate heater is greater than a second vertical distance from the bottom of the separator vessel to a top of the perforated lower portion of the partially perforated baffle plate;
   whereby the multiphase fluid flowstream from the upstream section is directed by the partially perforated baffle plate both horizontally and vertically through the immersed plate heater.

2. The separation system of claim 1, wherein the heating medium heater comprises a thermal fluid system.

3. The separation system of claim 1, wherein the separator vessel includes a separation section which is located downstream of the heating section and upstream of the oil accumulation section and a water outlet which is connected to the separation section, and wherein the separation section is separated from the oil accumulation section by an overflow weir.

4. The separation system of claim 3, wherein the heating section is separated from the separation section by at least one fully perforated baffle plate.

5. The separation system of claim 3, further comprising a plate pack coalescer which is positioned in the separation section.

6. The separation system of claim 1, further comprising an inlet device which is positioned between the inlet and the upstream section.

7. The separation system of claim 6, further comprising a run-off plate which extends from the inlet device to the upstream section.

8. The separation system of claim 7, wherein the run-off plate is connected to the partially perforated baffle plate.

9. The separation system of claim 1, wherein the solid upper portion extends vertically from a top edge of the partially perforated baffle plate to approximately a middle of the partially perforated baffle plate.

10. The separation system of claim 1, wherein the heating medium heater is configured to maintain the temperature of the multiphase fluid in the heating section above the predetermined temperature by increasing at least one of the flow rate and the temperature of the heating fluid in the immersed plate heater.

11. A method for treating a hydrocarbon flowstream, the method comprising:
    directing the hydrocarbon flowstream into an elongated separator vessel which includes at least an inlet for a multiphase fluid flowstream, an upstream section which is located downstream of the inlet, a heating section which is located downstream of the upstream section, a separation section which is located downstream of the heating section, an oil accumulation section which is located downstream of the separation section, and an oil outlet which is connected to the oil accumulation section;
    directing at least a portion of the hydrocarbon flowstream into the heating section; and
    heating said portion of the hydrocarbon flowstream with an immersed plate heater which is positioned in the heating section and is fluidly connected to a heating medium heater which is located externally of the separator vessel;
    wherein the immersed plate heater comprises an immersed plate heater bank comprising a plurality of generally rectangular, generally parallel spaced apart heat exchanger plates;
    wherein the heat exchanger plates are oriented generally vertically in the heating section generally parallel with a longitudinal axis of the separator vessel;
    wherein the upstream section is located horizontally adjacent to the heating section and is separated from the heating section by at least one partially perforated baffle plate, the partially perforated baffle plate including a solid upper portion and perforated lower portion which comprises a plurality of through holes; and wherein a first vertical distance from a bottom of the separator vessel to a top of the immersed plate heater is greater than a second vertical distance from the bottom of the separator vessel to a top of the perforated lower portion of the partially perforated baffle plate;

whereby the multiphase fluid flow stream from the upstream section is directed by the partially perforated baffle plate both horizontally and vertically through the immersed plate heater.

12. The method of claim 11, wherein the heating medium heater comprises a thermal fluid system.

13. The method of claim 11, wherein said portion of the hydrocarbon flowstream includes at least a water fraction and an oil fraction, said oil fraction comprises a number of light end hydrocarbons, and the method further comprises:

directing said portion of the hydrocarbon flowstream from the heating section into the separation section;

wherein the water fraction and/or the light end hydrocarbons separate from the oil fraction in the separation section.

14. The method of claim 13, wherein the method further comprises:

directing the oil fraction from the separation section into the oil accumulation section.

15. A separation system comprising:

an elongated separator vessel which includes:

an inlet for a multiphase fluid flowstream;

an upstream section which is located downstream of the inlet;

a heating section which is located downstream of and horizontally adjacent to the upstream section;

a separation section which is located downstream of and horizontally adjacent to the heating section;

an oil accumulation section which is located downstream of and horizontally adjacent to the separation section, the oil accumulation section being separated from the separation section by an overflow weir; and an oil outlet which is connected to the oil accumulation section;

an immersed plate heater which is positioned in the heating section; and a heating medium heater which is located externally of the separator vessel and is fluidly connected to the immersed plate heater;

wherein a heating fluid which is heated in the heating medium heater is circulated through the immersed plate heater to heat the multiphase fluid;

wherein the immersed plate heater comprises an immersed plate heater bank comprising a plurality of generally rectangular, generally parallel, spaced apart heat exchanger plates;

wherein the heat exchanger plates are oriented generally vertically in the heating section generally parallel with a longitudinal axis of the separator vessel:

wherein the upstream section is separated from the heating section by at least one partially perforated baffle plate, the partially perforated baffle plate including a solid upper portion and a perforated lower portion comprising a plurality of through holes; and wherein a first vertical distance from a bottom of the separator vessel to a top of the immersed plate heater is greater than a second vertical distance from the bottom of the separator vessel to a top of the perforated lower portion of the partially perforated baffle plate;

whereby the multiphase fluid flowstream from the upstream section is directed by the partially perforated baffle plate both horizontally and vertically through the immersed plate heater.

16. The separation system of claim 15, wherein the heating medium heater comprises a thermal fluid system.

17. The separation system of claim 15, wherein the heating section is separated from the separation section by at least one fully perforated baffle plate.

* * * * *